Dec. 20, 1960  O. R. BRUNZELL  2,965,387
THREE WHEELED CHILD'S WAGON
Filed Sept. 4, 1959  2 Sheets-Sheet 1
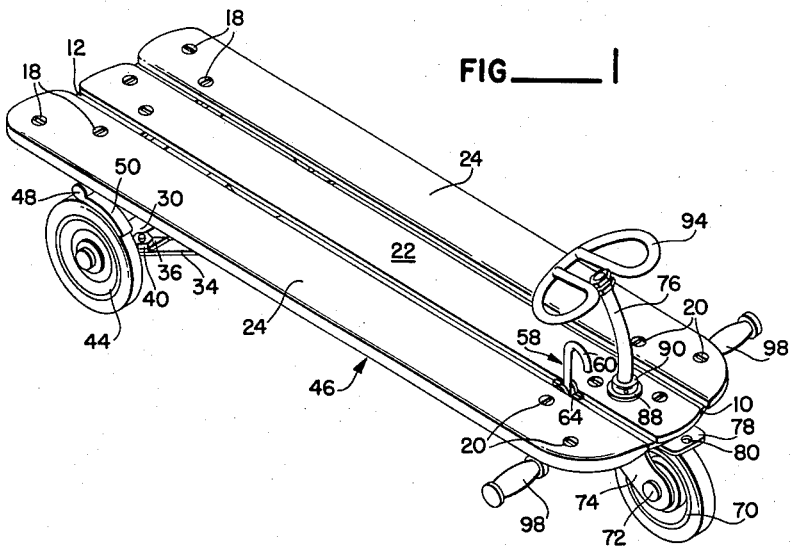
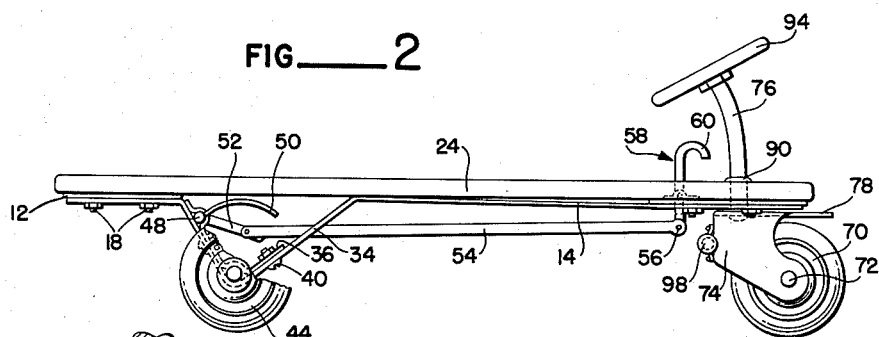
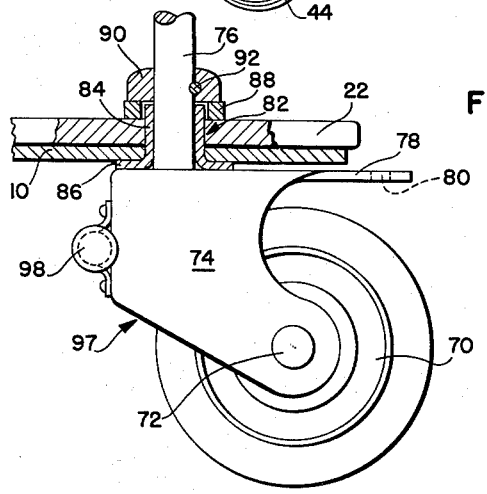
OTTO R. BRUNZELL
*INVENTOR.*
BY *Smith & Tuck*

Dec. 20, 1960 O. R. BRUNZELL 2,965,387
THREE WHEELED CHILD'S WAGON
Filed Sept. 4, 1959 2 Sheets-Sheet 2
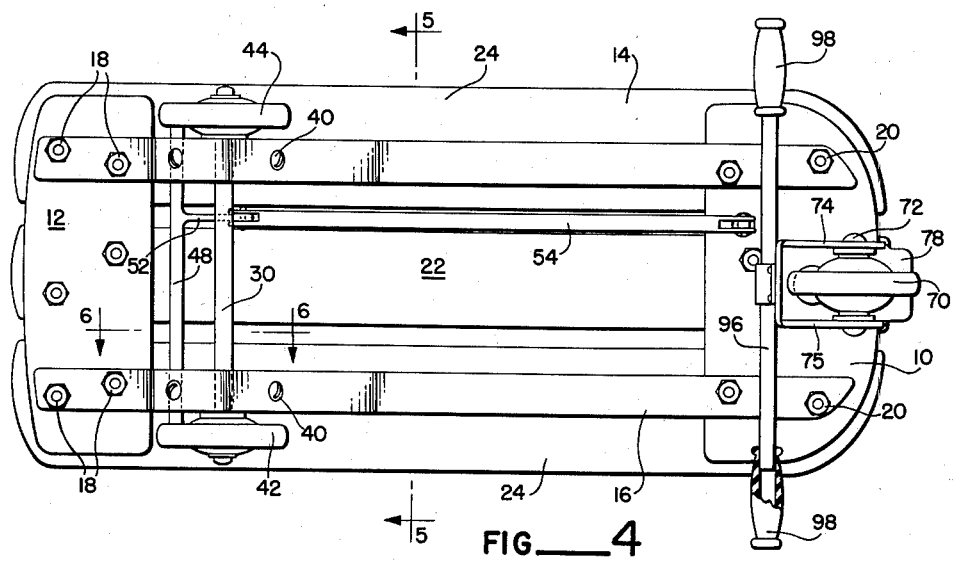
FIG. 4
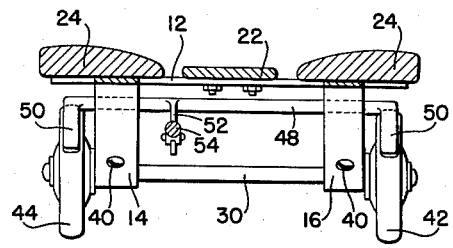
FIG. 5
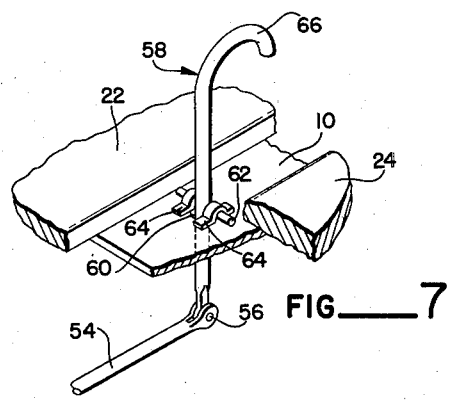
FIG. 7
FIG. 6
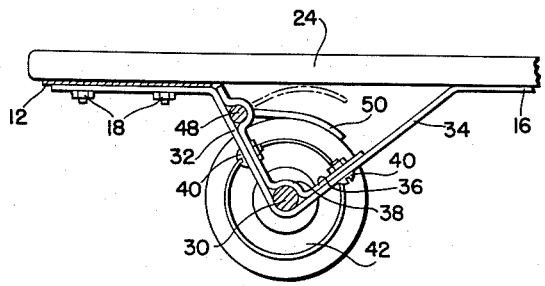
OTTO R. BRUNZELL
*INVENTOR.*
BY
*Smith + Tuck*

United States Patent Office 2,965,387
Patented Dec. 20, 1960

2,965,387

THREE WHEELED CHILD'S WAGON

Otto R. Brunzell, 2306 28th W., Seattle, Wash.

Filed Sept. 4, 1959, Ser. No. 838,175

3 Claims. (Cl. 280—87.01)

This present invention relates to the general art of toy wagons normally used by children for coasting and more particularly to a coaster wagon which is so constructed and reinforced that coasting can be done at relatively high speeds and with the ability to turn corners on one rear wheel and the front steering wheel.

There has been a very widespread development in coasters for children and each wagon is characterized by some special advantage or capability which tends to set it apart from other wagons. This present coaster is believed to have certain unique features which, while still producing a child's wagon of general utility, the wagon is characterized by features that lend it to competitive coasting because of the ease of handling the wagon at high speed and especially its ability to negotiate sharp turns at high speed.

The principal object of this present invention therefore is to provide a wagon having a basic metal framework which supports the wheels and makes it possible to adapt the wagon to a wide range of body forms.

A further object of this invention is to provide a coaster wagon having a single front wheel and this wheel supported on a forwardly extending fork pivoted on a substantially vertical axis and which has many of the properties of the front wheel of a bicycle as far as steering, particularly when curves are made on two wheels with the riders leaning into the turn.

Further objects, advantages and capabilities will be apparent from the description and disclosure in the drawings, or may be comprehended or are inherent in the device.

Figure 1 is a perspective view illustrating one preferred embodiment of this three wheeled child's wagon.

Figure 2 is a side elevation of the wagon of Figure 1.

Figure 3 is a vertical sectional view illustrating the bearing and supporting plate for the steering shaft and the front wheel supporting fork.

Figure 4 is a bottom plan of this wagon.

Figure 5 is a vertical cross-sectional view taken along the line 5—5 of Figure 4.

Figure 6 is a fragmentary cross-sectional view taken along the line 6—6 of Figure 4.

Figure 7 is a fragmentary perspective view with certain parts broken away to illustrate the manner of employing and supporting the brake lever associated with this wagon.

Referring to the drawings, throughout which like reference characters indicate like parts, the numeral 10 designates the front transverse metal plate and numeral 12 the rear transverse metal plate. These two metal plates, which extend for the tread width of the wagon are joined together by two spaced apart and parallel metal frame bars 14 and 16. The longitudinal frame bars 14 and 16 are secured to the transverse plates preferably by two bolts at each end of the frame bars as bolts 18 and bolts 20. These bolts, of which there are eight in all, preferably pass through the wagon top or wagon body as the case may be and provide a very secure but flexible anchoring means for the same.

One form of very satisfactory wagon body or deck is shown throughout the accompanying drawings and consists of a central board 22 which is through-bolted to the two transverse plates, the front and the rear, and on each side and parallel to board 22 are the side members or boards 24. These side members are preferably thicker than the central board 22 and slope inwardly, preferably as in the showing of Figure 5. The side members are preferably finished with rounded corners as illustrated. As will be noted in Figures 4 and 5 the side members 24 extend outwardly appreciably beyond the transverse plates so that they provide excellent hand grips on their margins for the passengers of the wagon, especially in making sharp turns.

The rear suspension of this wagon consists of a dead axle 30 which is fixedly secured in place by the longitudinally extending frame bars, one on each side of the wagon, which are bent down in triangular form as is best illustrated in Figure 6. The axle 30 is clamped between the two angularly disposed portions 32 and 34 of the frame bars 14 and 16 and the clamp member 36 which is formed at 38 to partially encircle the shaft, and adapted to be held in clamping position by a plurality of bolts 40. Wheels 42 and 44 are provided with suitable interior bearings, preferably of the antifriction type. Secured transversely of the wagon bed or top 46 is the rotary positioned brake shaft 48. The mounting of this shaft will be evident from a study of Figure 6 where it is held by the angled portion 32 of the side bars 14 and 16 and the clamp members 36, one on each side of the wagon. This arrangement differs from the holding of axle 30, however, in that shaft 48 must be capable of limited revolution. Fixedly secured to shaft 48 are the brake shoes 50, one for each of the rear wheels 42 and 44 which are shown in their two extreme positions in Figure 6, the released position being shown in dashed lines. It is to be noted that the brake shoes are resilient and when in their released position the shoe bearing portions have a shorter radius than the wheel which they engage and thus as more braking is required a greater area of the wheel tire can be engaged. Shaft 48 has fixedly secured to it the brake arm 52 which acts as a brake applying lever. Pivotably secured to arm 52 is the brake rod 54 which at its forward end is pivoted at 56 to the brake lever 58. The construction of brake lever 58 is best illustrated in Figure 7 where an opening 60 is provided through the front transverse plate. A pivot pin 62 is provided for lever 58 and this pin normally lies on the front transverse plate 10 and is secured thereto by straps as 64 which are normally welded to the metal front plate. Lever 58 is preferably provided with a hook-shaped end of considerable radius as indicated at 66 so that the lever may be hand or foot operated or a rope may be looped around the hook portion 66 so braking can be accomplished by one of the rear seated passengers, which is particularly desirable in coaster racing.

The front suspension means consists of a front wheel 70 which is mounted similarly to a front bicycle wheel in that its axle 72 is supported at each end by the side frames 74 and 75 which following bicycle practice, positions the wheel shaft or axle 72 forward of the steering shaft and wheel pivot 76 by a distance substantially equal to one half of the diameter of wheel 70. The fork is preferably formed of the two side members 74 and 75 which join the horizontal central portion 78. A through hole is provided at 80 for a towing line and it is to be noted that opening 80 is ahead of the vertical projection of axle 72 so proper tracking is assured. A flanged bearing is provided at 82 having the cylindrical bearing portion 84 for shaft 76 and a bearing flange 86 which supports the wagon top or body 46 and any passenger load from the front wheel and fork assembly. The construction of the front wheel assembly is illustrated in Figure 3. A spacing collar is employed at 88 and a set collar having a snug fit on shaft 86 is provided at 90. Suitable keying means is provided as the key pin 92.

Secured to the upper end of shaft 76 is the steering wheel 94. This wheel is not truly circular but provides a very economical construction that is very strong for the weight of material employed. Wheel 94 is suitably secured to the upper end of shaft 76. It will be noted in Figure 1 that spaced hand grip means is provided by the substantially semi-circular hand wheel 94 and in Figure 2 that wheel 94 has the characteristic sloping positioning of automobile steering wheels. Auxiliary to wheel 94 is a transverse bar 96 which is secured to fork 97 by suitable means, as the clip illustrated. As a safety measure bar 96 extends only to the vertical projection of the side members 24 and the handle grip portions 98 are flexible handles secured to bar 96, much as a bicycle or preferably a motorcycle handle is secured so that the only portion of the assembly that extends beyond the vertical projection of the side members is the yieldable rubber hand grips.

A very desirable feature of this coaster, and which results from the unique construction previously described, is the ability of the coaster to negotiate sharp turns using only one of the rear wheels and the front wheel with the passengers leaning into the curve much as the same is done by a bobsled crew or bicycle riders. It is under these conditions that the unique front wheel support arrangement is appreciated in that when the weight is supported on the two wheels, one rear and the front, it is not necessary to turn the front wheel 70 through much of an angle in negotiating the curve and this faculty makes it possible therefore to take curves at much higher speed than is possible with the ordinary four wheeled coaster and permits steering by means of grip portions 98 disposed substantially as illustrated in Figures 1 and 4.

It is believed that it will be apparent from the above description and the disclosure in the drawings that the invention comprehends a novel construction of a three wheeled child's coaster wagon.

Having thus disclosed the invention, I claim:

1. A three wheeled child's wagon, comprising: a metal frame consisting of a front transverse plate, a rear transverse plate and parallel spaced apart frame bars, one on each side of said wagon, secured to the opposite ends of said transverse plates to provide a rigid frame for said wagon; a rear axle disposed transversely of and fixedly positioned by said metal frame; two rear wagon wheels, one on each end of said axle, adapted to operatively support the rear end of said metal frame; a fork having a transverse wheel axle and a substantially vertical steering shaft, providing a revolvable pivot shaft for said fork and secured thereto and on the longitudinal axis of said metal frame adjacent the forward end thereof and disposed to operatively support the front end of said metal frame; a single wagon wheel operatively positioned by said fork and disposed forwardly of said steering shaft by a distance substantially equal to one half of the diameter of said single wheel; spaced hand grip means secured to said fork to provide means for steering said wagon.

2. A three wheeled child's wagon, comprising: a metal frame consisting of a front transverse plate, a rear transverse plate and parallel spaced-apart frame bars, one on each side of said wagon, secured to the opposite ends of said transverse plates to provide a rigid frame for said wagon; a rear axle disposed transversely of and fixedly positioned by said metal frame; two rear wagon wheels, one on each end of said axle, adapted to operatively support the rear end of said metal frame; a fork having a transverse wheel axle and a substantially vertical steering shaft, providing a revolvable pivot shaft for said fork, and secured thereto and on the longitudinal axis of said metal frame adjacent the forward end thereof and disposed to operatively support the front end of said metal frame; a single wagon wheel operatively positioned by said fork and disposed forwardly of said steering shaft by an amount substantially equal to one half the diameter of said single wheel; spaced hand grip means secured to said fork to provide means for steering said wagon; said rigid frame having secured to it a wagon deck having a central board and spaced therefrom on each side, a side board having a thickness greater than sad central board and extending outwardly beyond said transverse plates and said frame bars, to provide hand grips and said side boards having upper surfaces sloping downwardly and inwardly to form, with said central board, a longitudinally disposed depression tending to prevent sideward movement of passengers seated on said deck.

3. A three wheeled child's wagon, comprising: a metal frame consisting of a front transverse plate, a rear transverse plate and parallel spaced-apart frame bars, one on each side of said wagon, secured to the opposite ends of said transverse plates to provide a rigid frame for said wagon; a rear axle disposed transversely of and fixedly positioned by said metal frame; two rear wagon wheels, one on each end of said axle, adapted to operatively support the rear end of said metal frame; a fork having a transverse wheel axle and a substantially vertical steering shaft, providing a revolvable pivot shaft for said fork and secured thereto and on the longitudinal axis of said metal frame adjacent the forward end thereof and disposed to operatively support the front end of said metal frame; a single wagon wheel operatively positioned by said fork and disposed forwardly of said steering shaft by an amount substantially equal to one half the diameter of said single wheel; spaced hand grip means secured to said fork to provide means for steering said wagon; said hand grip means including a transverse bar, fixedly secured to the rear of said fork and extending substantially to but not beyond the vertical projection of said wagon deck and resilient handle grip portions secured to each end of said bars and extending outwardly beyond the vertical projection of said wagon deck.

References Cited in the file of this patent

UNITED STATES PATENTS

| | | |
|---|---|---|
| 967,423 | Orcutt | Aug. 16, 1910 |
| 1,327,123 | Thomas | Jan. 6, 1920 |
| 1,563,401 | Rousseau | Dec. 1, 1925 |
| 1,662,292 | Bender | Mar. 13, 1928 |
| 1,724,564 | Craig | Aug. 13, 1929 |
| 1,900,108 | Hedeen et al. | Mar. 7, 1933 |
| 2,510,798 | Cahill | June 6, 1950 |
| 2,766,994 | Ayers | Oct. 16, 1956 |